(12) United States Patent
Sharan et al.

(10) Patent No.: US 9,569,471 B2
(45) Date of Patent: Feb. 14, 2017

(54) ASSET MODEL IMPORT CONNECTOR

(75) Inventors: Dhiraj Sharan, Sunnyvale, CA (US); Qiang Zeng, San Ramon, CA (US); Sez Ming Yee, Milpitas, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 300 days.

(21) Appl. No.: 14/233,178

(22) PCT Filed: Aug. 1, 2012

(86) PCT No.: PCT/US2012/049188
§ 371 (c)(1),
(2), (4) Date: Jan. 16, 2014

(87) PCT Pub. No.: WO2013/019879
PCT Pub. Date: Feb. 7, 2013

(65) Prior Publication Data
US 2014/0156711 A1 Jun. 5, 2014

Related U.S. Application Data

(60) Provisional application No. 61/514,012, filed on Aug. 1, 2011.

(51) Int. Cl.
*G06F 17/30* (2006.01)
*H04L 12/24* (2006.01)
*H04L 29/06* (2006.01)

(52) U.S. Cl.
CPC ....... *G06F 17/30294* (2013.01); *H04L 41/022* (2013.01); *H04L 41/0266* (2013.01); *H04L 41/0631* (2013.01); *H04L 63/1416* (2013.01)

(58) Field of Classification Search
CPC ................ G06F 17/30; G06F 17/30303; G06F 17/30569; G06F 17/30893
See application file for complete search history.

(56) References Cited

U.S. PATENT DOCUMENTS

| | | | |
|---|---|---|---|
| 7,747,480 B1 * | 6/2010 | Agresta | G06Q 10/087 700/1 |
| 2003/0229559 A1 | 12/2003 | Pattaja et al. | |
| 2004/0225491 A1 * | 11/2004 | Chang | G06F 17/248 704/2 |

(Continued)

FOREIGN PATENT DOCUMENTS

| | | |
|---|---|---|
| CN | 101009591 A | 8/2007 |
| TW | 200837571 A | 9/2008 |

OTHER PUBLICATIONS

International Searching Authority, Appl. No. PCT/US2012/049188, Filed Aug. 1, 2012, Search Report and Written Opinion, 9pp, Dated Feb. 5, 2013.

(Continued)

*Primary Examiner* — Yuk Ting Choi
(74) *Attorney, Agent, or Firm* — Mannava & Kang, P.C.

(57) ABSTRACT

An asset model import connector includes an interface to receive asset data from a data source and a normalize module. The normalize module determines an operation to be performed at a system based on the received asset data and determines code to perform the determined operation. The schema may be populated with attributes from the asset data, and sent to the system.

16 Claims, 6 Drawing Sheets

(56) References Cited

U.S. PATENT DOCUMENTS

| | | | |
|---|---|---|---|
| 2006/0178917 A1 | 8/2006 | Merriam et al. | |
| 2006/0178954 A1* | 8/2006 | Thukral | G06Q 10/087 705/28 |
| 2006/0200477 A1 | 9/2006 | Barrenechea | |
| 2006/0265598 A1* | 11/2006 | Plaquin | H04L 63/0892 713/182 |
| 2007/0130192 A1* | 6/2007 | Bolder | H04L 41/0806 707/999.102 |
| 2008/0104276 A1* | 5/2008 | Lahoti | G06F 21/577 709/245 |
| 2008/0281962 A1 | 11/2008 | Kai et al. | |
| 2009/0216775 A1 | 8/2009 | Ratliff et al. | |
| 2010/0106742 A1 | 4/2010 | Guruswamy | |
| 2011/0004622 A1 | 1/2011 | Marson | |

OTHER PUBLICATIONS

New! Provance Data Management Pack for Microsoft System Center Service Manager 2012, Provance: IT Asset Management for Microsoft System Center, download date; Aug. 1, 2012. < http://www.provance.com/en/Products/Data_Management_Pack.html >.

David, "OpenNMS Provisioning," OpenNMS version 1.8.0, Jan. 21, 2010, pp. 1-34, The OpenNMS Group, Inc., USA, Available at: <opennms.org/w/images/c/ca/ProvisioningUsersGuide.pdf>.

Extended European Search Report, EP Application No. 12819296.0, Date: Dec. 16, 2014, pp. 1-10, European Patent Office.

Indigo, "File:ProvisioningUsersGuide.pdf—OpenNMS," Revision Date: Jul. 10, 2014, pp. 1-2, The OpenNMS Group, Inc., Available at: <wiki.opennms.org/w/index.php?title=File:ProvisioningUsersGuide.pdf&oldid=16197>.

Jeffg, "New and Noteworthy: From OpenNMS," Feb. 25, 2011, pp. 1-23, Release 1.9.6, OpenNMS.org, Available at: <opennms.org/w/index.php?title=New_and_noteworthy&oldid=11436>.

Office Action, CN Application No. 201280048361.2 , Date: Jul. 26, 2016, pp. 1-10, SIPO.

Rangerrick et al., "opennms / opennms-base-assembly / src / main / filtered / bin / provision pi," Jan. 12, 2010. pp. 1-11. GitHub, Inc., Available at: <github.com/OpenNMS/opennms/blob/918e6a988ed23b33ce37d47b12a78613e903db40/opennms-base-assembly/src/main/filtered/bin/provision.pl>.

\* cited by examiner

```xml
<?xml version="1.0" encoding="UTF-8"?>
<!DOCTYPE archive SYSTEM "../../schema/xml/archive/arcsight-archive.dtd">
<archive buildVersion="5.2.0.0" buildTime="4-11-2011_17:18:44" user="admin" createTime="04-12-2011_12:41:34.182">
    <Asset externalID="XYZ1assetexternalid" name="XYZ1asset" alias="XYZ1assetalias" action="insert">
        <address>11.11.11.11</address>
        <childOf>
            <list>
                <ref type="Group" uri="/All Assets/XYZ1group/"/>
                <ref type="Group" uri="/All Assets/XYZ2group/"/>
            </list>
        </childOf>
        <description>The rain in Spain falls mainly on the plain</description>
        <hasLocation>
            <list>
                <ref type="Location" uri="/All Locations/ArcSight System/ArcSight"/>
            </list>
        </hasLocation>
        <hostname>localhost</hostname>
        <inCategory>
            <list>
                <ref type="Group" uri="/All Asset Categories/System Asset Categories/Criticality/High/"/>
                <ref type="Group" uri="/All Asset Categories/System Asset Categories/Criticality/Low/"/>
                <ref type="Group" uri="/All Asset Categories/System Asset Categories/Criticality/Medium/"/>
            </list>
        </inCategory>
        <inZone>
            <list>
                <ref type="Zone" uri="/All Zones/XYZ1zone/"/>
            </list>
        </inZone>
        <macAddress>11:11:11:11:11:11</macAddress>
    </Asset>
</archive>
```

FIG. 2

```
<?xml version="1.0" encoding="UTF-8"?>
<!DOCTYPE archive SYSTEM "../../schema/xml/archive/arcsight-archive.dtd">
<archive buildVersion="5.2.0.0" buildTime="4-11-2011 17:18:44" user="admin" createTime="04-12-2011_09:16:19.661">
    <!-- deleting asset by group -->
    <Asset name="XYZasset" action="remove">
        <childOf>
            <list>
                <ref type="Group" uri="/All Assets/XYZassetgroup/" />
            </list>
        </childOf>
    </Asset>
</archive>
```

```
<?xml version="1.0" encoding="UTF-8"?>
<!DOCTYPE archive SYSTEM "../../schema/xml/archive/arcsight-archive.dtd">
<archive buildVersion="5.2.0.0" buildTime="4-11-2011_17:18:44" user="admin" createTime="04-11-2011_18:30:34.592">
    <Asset name="XYZasset" action="update">
        <childOf>
            <list>
                <ref type="Group" uri="/All Assets/XYZmovedgroup/" action="insert"/>
                <ref type="Group" uri="/All Assets/XYZ2movedgroup/" action="insert"/>
                <ref type="Group" uri="/All Assets/XYZ3movedgroup/" action="insert"/>
                <ref type="Group" uri="/All Assets/XYZassetgroup/" action="remove"/>
            </list>
        </childOf>
    </Asset>
</archive>
```

ASSET MODEL IMPORT CONNECTOR

PRIORITY

The present application claims priority to U.S. Provisional Patent Application Ser. No. 61/514,012, filed Aug. 1, 2011, which is incorporated by reference in its entirety.

BACKGROUND

Many systems nay be used concurrently to manage a network. For example, Active Directory stores information about network devices and network security. Network administrators also typically use information technology (IT) management software to configure, deploy and manage devices in the network. The IT management software may include a configuration management database to store information about the network. Typically, these systems do not follow a common standard for interfacing with other systems and providing data to other systems.

BRIEF DESCRIPTION OF DRAWINGS

The embodiments are described in detail in the following description with reference to the following figures.

FIGS. 2-4 illustrate examples of code for different operations;

DETAILED DESCRIPTION OF EMBODIMENTS

Figure 1:
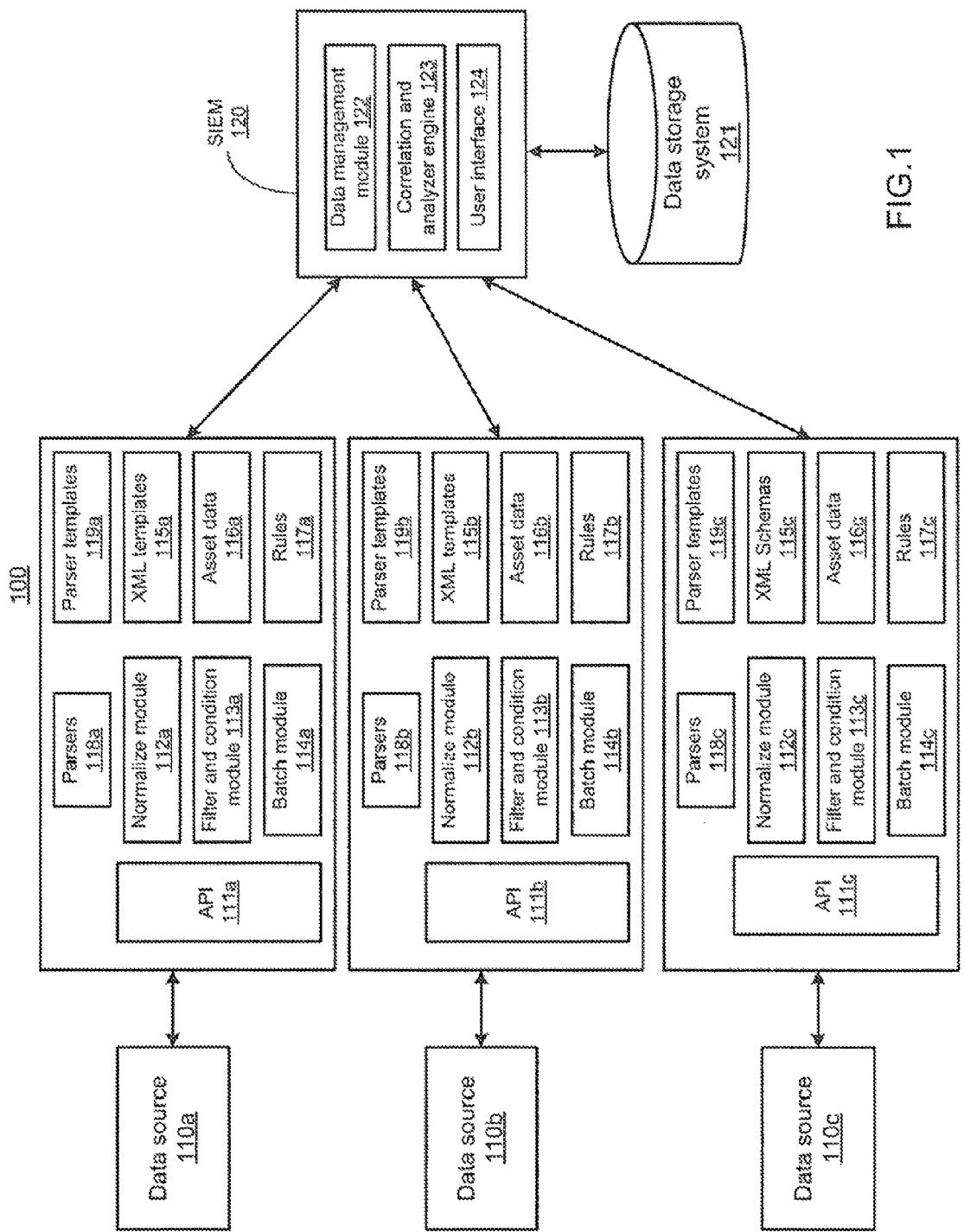
FIG. 1 illustrates a system, according to an embodiment.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, asset model import connectors (MICs) collect asset information from a plurality of data sources. The asset MICs may collect the asset information from a variety of different sources in a variety of data formats, such as files, information from databases, etc. Once the asset information is in an asset MIC, further processing may be done, such as filtering, condition matching and data normalization. The normalized asset information may then be sent to a system from the asset MIC. The system may store asset data for assets. The asset data at the system may be stored according to a schema. The schema may indicate attributes of assets that are stored and the organization of the stored data. The asset data at the system is updated based on the asset information received from the data sources at the asset MICs. The asset MICs may normalize data from the data sources to extensible markup language (XML) understood by the system so the system can determine the operations to update the asset data based on the information from the data sources. Each asset MIC may store multiple XML templates and the asset MIC determines the XML template to be used based on operations to be performed on the asset data at the system. The system may be a security information and event management system as described below. Also, the asset MICs may store the asset data. In the event of service interruptions of the other system, asset information stored in the asset MICs may be used to recover from the service interruptions. Also, XML is an example of one type of programming language for providing code to the system to perform data operations. The code may be provided to the system in other languages.

Assets may include any device with a network interface, such as severs, laptops, personal computers, routers, gateways, mobile devices, etc. Asset information collected by the asset MICs may include attributes of the assets. Examples of the attributes may include IP address, MAC address, subnet or zone, device description, host name, etc.

The asset information may be stored and associated with each asset. For example, asset information includes attributes specific to the asset, such as IP address, MAC address, host name and zone. A zone may be an IP address range and may be for a particular subnet. The asset attributes help uniquely identify each asset. Asset information may include resource attributes, such as name of the asset, who is the creator, who is the owner, when it was updated, and when it was created originally. These attributes may be common to any resource type.

The asset information may include categories, and a category may be hierarchal. For example, hierarchal categories may categorize assets by physical location starting from what office location it is in, what building, what floor, and what lab. Other examples of categories may include categories by business function, such as finance, payroll, etc. Another category may be based on compliance, such as indicating which assets need compliance with which government regulations. For example, using these categories, a user may be able to identify all the devices in a particular location that are for a particular business function and need to be Sarbanes-Oxley compliant.

The asset information may include groups. A group may be defined based on one or more attributes, and an asset is included in the group if its attribute value(s) match the attribute value(s) of the group. Groups may be hierarchal as well, including parent and child groups.

The asset information collected by the asset MICs may be stored in a data storage system for a Security Information and Event Management (SIEM) system. The SIEM stores the asset information, user information and real-time event data for a network. The SIEM may correlate and analyze event data to identify security threats. A security event, also referred to as an event, is any activity that can be analyzed to determine if it is associated with a security threat. The activity may be associated with a user, also referred to as an actor, to identify the security threat and the cause of the security threat. Activities may include logins, logouts, sending data over a network, sending emails, accessing applications, reading or writing data, etc. A security threat includes activity determined to be indicative of suspicious or inappropriate behavior, which may be performed over a network or on systems connected to a network. Common security threats, by way of example, are user attempts to gain unauthorized access to confidential information over a network.

The data sources for the events may include network devices, applications or other types of data sources described below that are operable to provide event data that may be used to identify network security threats. Event data is data describing events. Event data may be captured in logs or messages generated by the data sources. For example, intrusion detection systems (IDSs), intrusion prevention systems (IPSs), vulnerability assessment tools, firewalls, anti-virus tools, anti-spam tools, and encryption tools may generate logs describing activities performed by the source.

Event data may be provided, for example, by entries in a log file or a syslog server, alerts, alarms, network packets, emails, or notification pages.

Event data can include information about the device or application that generated the event and when the event was received from the event source ("receipt time"). The receipt time may be a date/time stamp, and the event source is a network endpoint identifier (e.g., an IP address or Media Access Control (MAC) address) and/or a description of the source, possibly including information about the product's vendor and version. The data/time stamp, source information and other information is used to correlate events with a user and analyze events for security threats.

The user data stored in the SIEM may include user profiles which include account IDs associated with each user. The information may also include user account ID history and user account ID authenticator information. The data storage system is not limited to storing security events and may store other information.

Event data from logs nay be correlated with asset information received from the MICs to provide additional information about events. For example, logs may indicate five failed login attempts happened consecutively at a predetermined time from one or more IP addresses. The asset information collected from the MICs for the IP addresses may be provided with the log information and user information in reports to a system administrator so the system administrator can get a "big picture" about the failed login attempts. For example, the asset information may indicate hierarchal category information for the IP addresses, such as MAC address, host name and zone, or department information. This information may indicate that the failed login attempts are coming from the same zone and from the same department of a corporation. This may indicate a problem with the system administration for that department or a problem with security for that zone and department. Further remedial action may then be taken.

FIG. 1 illustrates a system 100, according to an embodiment. The system 100 includes asset MICs 101a-c collecting asset data from data sources 110a-c respectively. The system 100 may have more or less than three asset MICs and each asset MIC may connect to more than one data source. The data sources 110a-c provide network information about the assets in a network. The data sources 110a-c, for example, may include Active Directories, configuration management databases, system administrator spreadsheets, etc. Each asset MIC may include application program interfaces (APIs) 111a-c or other interfaces for collecting data from the particular data source. Also, each asset MIC normalizes asset data from a data source for example by mapping the asset data to a schema based on the operations to be performed by the SIEM 120 on the asset data stored at the SIEM 120.

For example, the asset MICs 101a-c send asset information collected from the data sources 110a-c in XML to the SIEM 120. The asset information sent to the SIEM 120 may be coded in XML depending on the type of operation to be performed on the asset data stored at the SIEM 120. XML templates 115a-c may be stored at the asset MICs 101a-c, and each XML template includes XML code for performing an operation on the asset data stored at the SIEM 120.

The SIEM 120 receives asset data from the data sources 110a-c via the asset MICs 101a-c and stores the asset data in the data storage system 121. For example, the SIEM 120 includes a data management module 122 that receives asset data that conforms to an XML schema from the asset MICs 101a-c and stores the asset data in the data storage system 121 according to the XML schema. The data storage system 121 may include one or more tables in a database storing asset data, information about users and event data received from data sources. The data management module 122 may perform data operations on the asset data stored in the data management module 122 based on XML, including asset data, that is received from the asset MICs 101a-c. The operations may be for updating a table storing asset data in the data storage system 121. Examples of the operations and XML specifying the operations and asset attributes are described in further detail below.

The SIEM 120 also includes correlation and analyzer engine 123 to correlate and analyze event data to identify threats or determine other information associated with events. Correlating and analyzing event data may include automated detection and remediation in near real-time, and post analytics, such as reporting, pattern discovery, and incident handling.

Correlation may include correlating event data with users and assets to associate activities described in event data with particular users and assets. For example, from a set of base event fields in an event table in the data storage system 121, information for an event may be correlated with attributes of a user and an asset associated with an event. For example, event data may include a unique user identifier (UUID), asset ID or IP address and application event fields and these fields are used to look up user and asset information in the data storage system 121 to identify a user and asset having those attributes at the time the event occurred. In an example, an attack is detected, which was allowed by a firewall, and it targeted a machine that was found to be vulnerable by a vulnerability scanner. Correlating the event information with asset data can determine attributes of the machine that may be comprised and may identify parent groups of machines that may also be comprised by the attack.

Analyzing event data may include using rules to evaluate each event with network model and vulnerability information to develop real-time threat summaries. This may include identifying multiple individual events that collectively satisfy one or more rule conditions such that an action is triggered. The aggregated events may be from different data sources and are collectively indicative of a common incident representing a security threat as defined by one or more rules. The actions triggered by the rules may include notifications transmitted to designated destinations (e.g., security analysts may be notified via consoles e-mail messages, a call to a telephone, cellular telephone, voicemail box and/or pager number or address, or by way of a message to another communication device and/or address such as a facsimile machine, etc.) and/or instructions to network devices to take action to thwart a suspected attack (e.g., by reconfiguring one or more of the network devices, and or modifying or updating access lists, etc.). The information sent with the notification can be configured to include the most relevant data based on the event that occurred and the requirements of the analyst.

The SIEM 120 maintains reports regarding the status of security threats and their resolution. The SIEM 120 may provide notifications and reports through user interface 124 or by sending the information to users or other systems. Users may also enter domain schema information and other information via the user interface 124.

Referring to the asset MICs 101a-c, asset data may be processed by different processing stages in each asset MIC. The asset MICs 101a-c include normalize modules 112a-c to normalize asset data collected from the data sources 110a-c to schemas used by the SIEM 120. The normalizing modules 112a-c may include parsers 118a-c. The parsers 118a-c parse the asset data collected from the data sources 110a-c to identify data to be mapped to fields in the data storage system 121. For example, the asset MIC 101a receives a file in a comma-separated values (CSV) format from the data source 110a. The file may include attributes of an asset and other information. For example, the comma-separated values may include values for one or more of action, asset active/inactive, inactive reason, asset name, IP, MAC, host name, external ID, alias, parent group URI, old parent group uniform resource identifier (URI), asset description, zone URI, location URI, asset category, etc. The action may be an operation to be performed, for example, by the SIEM 120, such as add asset, remove asset, add category, etc. A parser from the parsers 118a identifies the values of the attributes in the file and the normalize module 112a maps the values to one of the XML templates 115a. For example, XML templates 115a are stored at the computer system hosting the MIC 101a. The normalize module 112a selects an XML template and maps collected asset data to the XML template.

The parsers 118a may be customized by a user to identify particular fields from the asset data received from the data source 110a. Parser templates 119a may be used to customize a parser. The parser templates 119a may be working parsers that a user can execute "out of the box" to map data from a data source to the schema of the asset data stored in the data storage system 121. The parser templates 119a are also customizable so a user can modify a parser as needed without generating a parser from scratch for their data source. The parser template specifies information about the data source and the destination, which is the data storage system 121. By way of example, a parser template of the parser templates 119a may provide the following indications: a type of a source (e.g., database, log file, etc., whether the source is providing a single file or multiple files, real-time or batch mode, content format of data source file, token definitions, data type of tokens, mappings from source fields to fields in schema, and other data attributes. A user may use a text editor or another user interface to modify information in the template. For example, the user may modify a source field mapping to a different field in the schema, or the user may modify the data type of the destination mapping so the data type matches the data type of the field in the schema, or the user may modify the data source type. Many other types of modifications may be made to a parser template to customize it as needed.

A processing stage may include filtering and condition matching performed by the filter and condition matching modules 113a-c in the asset MICs 101a-c. Filtering and condition matching performed by the filter and condition matching modules 113a-c may include identifying specific data collected from each of the data sources 110a-c to send to the SIEM 120. For example, filtering and condition matching may be used to send only data for servers for a specific business application or in a specific location. Rules 117a-c implemented by the filter and condition matching modules 113a-c may be stored at the computer systems for the asset MICs 101a-c that specify the matching and filtering conditions. The rules 117a-c may be provided by the SIEM 120 or a user.

Another processing stage may include batching asset data instead of sending the data continuously to the SIEM 120. Batching may be performed by the batching modules 114a-c. The batching modules 114a-c may control how much data is sent to the SIEM 120 and when it is sent, so the SIEM 120 can process the data without dropping data. Furthermore, if the SIEM 120 is unavailable, the asset MICs 101a-c may continue to receive and store asset data from the data sources 110a-c and the batching modules 114a-c may send the data to the SIEM 120 when the SIEM 120 is ready. The processing stages may be implemented as modules comprised of machine readable instructions executable by a processor or other processing circuit.

The asset MICs 101a-c may reside on sewers or other types of computer systems between the data sources 110a-c and the SIEM 120. In other examples, the asset MICs 101a-c may reside on computer systems at the data sources 110a-c or even at the SIEM 120.

The normalize modules 112a-c generate code, such as XML, depending on operations that are to be performed at the SIEM 120. The code may be generated from the XML templates 115a-c. The code includes asset data collected from the data sources 110a-c. The data storage system 121 of the SIEM 120 stores asset data collected by the asset MICs 101a-c along with other event data. The SIEM 120 performs operations on the asset data stored in the data storage system 121 to keep the asset data up to date depending on the changes indicated by the data source 110a-c. The operations may include adding an asset, removing an asset, moving an asset from one group to another, adding an asset to a group, removing an asset from a group, moving an asset from one category to another to another, adding an asset to a category, removing an asset from a category, moving an asset from one zone to another, adding an asset to a zone, removing an asset from a zone, and marking an asset as enabled or disabled.

The asset MICs 101a-c may determine the operations to be performed at the SIEM 120 based on the asset data received from the data sources 110a-c. In one example, the asset data received from a data source indicates the operation to be performed. In another example, the asset MICs 101a-c determine the operation to be performed based on other data collected from the data sources 110a-c. For example, the data sources 110a-c may generate logs indicating operations performed on assets. The asset MICs 101a-c may parse the logs to determine the operations to be performed.

FIG. 2 shows an examples of XML 200 that may be generated by a normalize module for the operation of adding an asset to the asset data stored at the data storage system 121 for the SIEM 120. For example, the MIC 101a receives asset data from data source 110a. The asset data may be in a delimited file. Table A below shows an example of some of the attributes and their values that may be in the asset data in the delimited file.

TABLE A

| Attribute | Value |
| --- | --- |
| Asset Name | XYZ1asset |
| Parent Group URI (s) | /All Assets/XYZ1group;/All Assets/XYZ2group |
| External Id | XYZ1assetexternalid |
| IP Address | 11.11.11.11 |
| MAC Address | 11:11:11:11:11:11 |
| Host Name | Localhost |
| Alias | XYZ1assetalias |
| Asset Description | The rain in Spain falls mainly on the plain |
| Zone URI | /All Zones/XYZ1zone |
| Location URI | /All Locations/ArcSight System/ArcSight |
| Asset Category URI (s) | /All Asset Categories/System Asset Categories/Criticality/Low |
|  | /All Asset Categories/System Asset Categories/Criticality/High |
|  | /All Asset Categories/System Asset Categories/Criticality/Medium |

The MIC 101a determines the operation to be performed is to add an asset, and selects one of the XML templates 115a that corresponds to that operation. The template includes the XML 200. The XML 200 includes the attributes from the XML schema that are used for the operation. The attributes, for example, include external ID, name, alias, group, description, category, zone, and MAC address. The normalize module 112*a* parses, for example, a CSV file from the data source 110*a* that includes the asset data from the data source 110*a* to identify attributes, which are specified in the XML 200, and the values for the attributes. Examples of some of the values are shown in the value column in Table A and in FIG. 2. The XML 200 is populated with the values for the attributes determined from the parsing. The populated XML 200 is sent to the SIEM 120. The SIEM 120 reads the XML 200 and adds the asset "XYZ1asset" and its attributes to the asset data stored in the data storage system 121.

FIG. 3 illustrates XML 300 for deleting an asset which is derived from the XML template for the delete operation. For example, the MIC 101*a* receives asset data from the data source 110*a* indicating to delete an asset and also including attributes identifying the asset to be deleted. The attributes are an asset name and an asset identifier. In this example, the asset name is "XYZasset" and the asset identifier is a URI "/All Assets/XYZassetgroup/". In another example, the asset identifier may be an external ID for example used by the data source 110*a*. XML 300 is populated with the values for the attributes and sent to the SIEM 120 to perform the operation for deleting the asset from, for example, an asset table stored in the data storage system 121.

FIG. 4 illustrates an XML 400 for moving an asset from one group to another which is derived from the XML template for the move group operation. The asset attributes in the asset data received from the data source 110*a* include asset name and groups. The groups identify the group(s) removed from and the group(s) added to for the asset. In this example, the asset name is "XYZasset" and the URI of the group to be removed from is "/All Assets/XYZassetgroup/". The URIs of the target groups to be added to are "/All Assets/XYZmovedgroup/", "/All Assets/XYZmoved2group/" and "/All Assets/XYZmoved3group/". The SIEM 120 adds the "XYZasset" asset to the target groups in the data storage system 121 and removes the asset from "/All Assets/XYZassetgroup/".

XML templates for other operations may be stored at the asset MICs 101*a-c*. In a similar manner to the examples described above, the operation to be performed is determined, the XML template is selected and the attributes to be included in the XML for the operation are determined from the template and their values parsed from the asset data collected from the data sources 110*a-c*. For example, for removing an asset from a group, the attributes include asset name and identifier for the group to be removed from. For adding an asset to a group, the attributes include asset name and identifier for the group to be added to. Adding, deleting or moving a category or zone are similar to adding, deleting or moving a group for an asset. Attributes for marking an asset as enabled or disabled may include asset name, asset identifier, whether the asset is active or inactive, and a reason for being inactive if provided.

Figure 5:
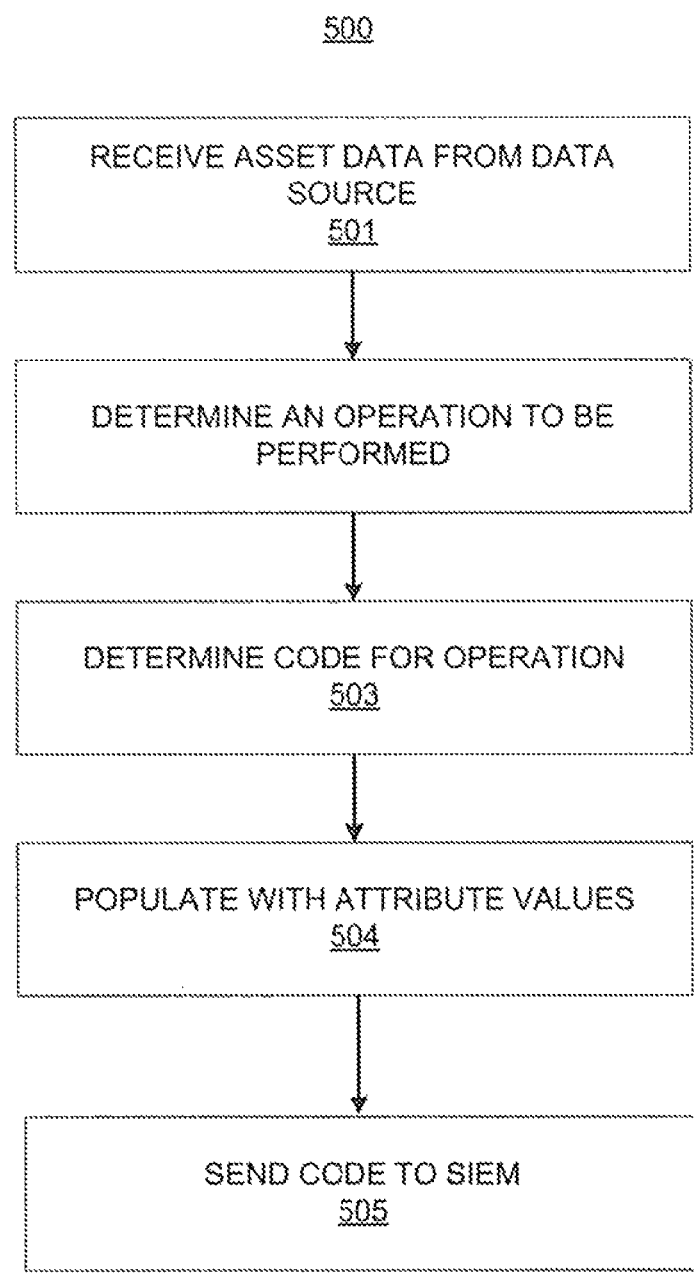
FIG. 5 illustrates a method for normalizing asset data.

FIG. 5 illustrates an example of a method 500 for collecting asset data from data sources. The method 500 is described with respect to the system 100 shown in FIG. 1 by way of example and not limitation. The method 500 may be performed by other systems.

At 501, asset data is received from a data source at an asset MIC. For example, the asset MIC 101*a* receives asset data from the data source 110*a*. The asset data may be pushed or pulled from the data sources 110*a-c*. The data source may provide the asset data in a delimited file, such as a CSV file. A file including asset data may be provided in other formats, such as key-value pair, fixed length, variable length records, etc. A user may specify the format through modifications to a parser template.

At 502, the asset. MIC determines an operation to be performed at the SIEM 120 based on the received asset data. For example, the asset data may specify the operation, and the asset data is parsed by the asset MIC 101*a* to determine the operation. In another example, the operation is determined based on the data source. For example, different log file folders at the data source 110*a* may store asset data for particular operations. For example, one log file folder is for storing information for new assets, another log file folder is for storing information for deleted assets, etc. The asset MIC 101*a* may identify the log file folder storing the received asset data, and based on the folder, the asset MIC 101*a* determines the operation to be performed.

In another example, if the operation is not specified in the received asset data, a rule is applied to determine the operation. For example, a rule may indicate that if certain attributes or patterns are detected when parsing a received file, then assign a particular operation to the asset data in the file. For example, if an attribute indicates that than inactive status of an asset is set to true, then the normalize module 112*a* determines the operation associated with the asset data is delete asset. Rules for determining an operation may be provided in the parser templates 119*a* or may be in the rules 117*a*.

In another example, the asset MIC may get information from the SIEM 120 to determine the operation. For example, the asset data received at the asset MIC 101*a* from the data source 110*a* indicates an operation to add an asset to a group. The asset MIC 101*a* sends a message to the SIEM 120 to determine if the group exists in the event data stored in the data storage system 121. If the group does not exist, the asset MIC 101*a* determines the operation to be performed at the SIEM 120 is to create a group. The group may be created in a hierarchy. For example, the asset data may include an attribute that indicates the URI for a parent group. The asset MIC 101*a* determines the operation to be performed at the SIEM 120 is to create a child group under the identified parent group. The asset MIC 101*a* also determines an additional operation is to add the asset to the newly created group. Similar determination of operations may be made for adding or deleting or modifying categories or zones.

At 503, the asset MIC generates code for the operation to be performed. In one example, the code is XML. Examples of XML for different operations are shown in FIGS. 2-4. Instead of XML, other types of languages may be used for the code, such as Java, Json, etc. Code for operations may be generated based on templates, such as the XML templates 115. For example, an XML template for an operation is selected and used for the code.

At 504, the asset MIC populates the code with attribute values. For example, the received asset data is parsed to determine attribute values and the values are put into the code. For example, the received asset data may include attributes such as asset name, parent group URI(s), external ID, IP address, MAC address, etc. Additional examples of attributes are described above. The values for the attributes are included in the XML from the template.

At 505, the populated code is sent to the SIEM 120. For example, XML is sent over a network to the SIEM 120. The SIEM 120 receives the XML and performs the operation described in the XML. For example, if the XML is to add an asset, the SIEM 120 adds an asset to asset information stored in the data storage system 121, including the attributes of the new asset specified in the XML. In another example, the XML schema may specify to change a zone for an asset. The SIEM 120 reads the XML schema and changes the zone assigned to the asset in the data storage system 121.

Figure 6:
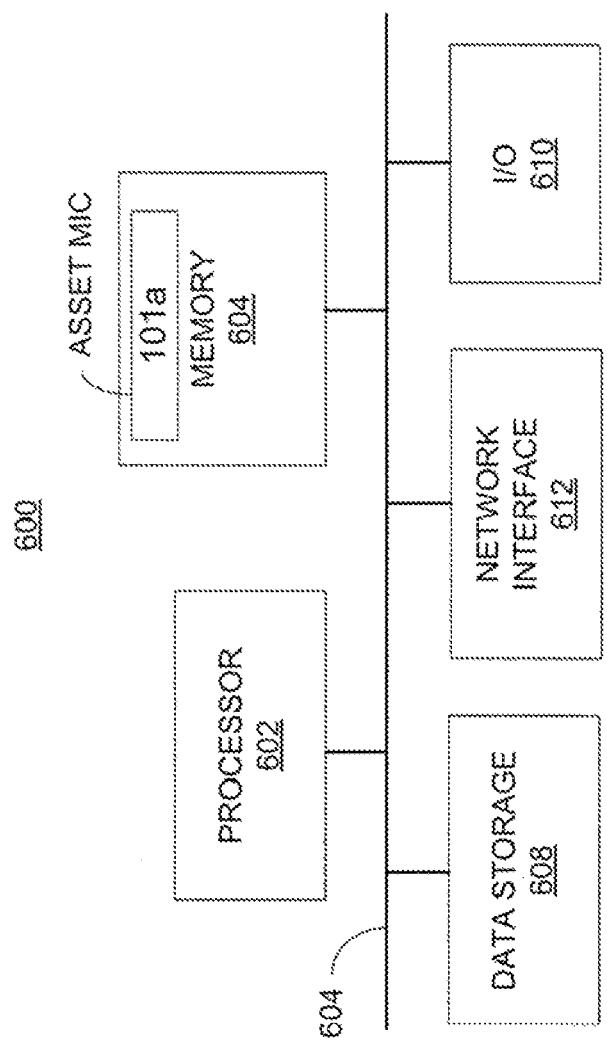
FIG. 6 illustrates a computer system that may be used the method and system, according to an embodiment.

FIG. 6 shows a computer system 600 that may be used with the embodiments described herein. The computer system 600 represents a generic platform that includes components that may be in a server or another computer system. The computer system 600 may be used as a platform for one or more of the asset MICs 101a-c shown in FIG. 1. The computer system 600 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 that may implement or execute machine readable instructions performing some or all of the methods, functions and other processes described herein. Commands and data from the processor 602 are communicated over a communication bus 606. The computer system 600 also includes a memory 604, such as a random access memory (RAM), where the machine readable instructions and data for the processor 602 may reside during runtime, and a secondary data storage 608, which may be non-volatile and stores machine readable instructions and data. The memory 604 and data storage 608 are examples of computer readable mediums. Asset MIC 101a is shown as residing in the memory 604 to illustrate that the asset MIC 101a may comprise machine readable instructions executed by the processor 602.

The computer system 600 may include an I/O device 610, such as keyboard, a mouse, a display, etc. The computer system 600 may include a network interface 612 for connecting to a network. For example, the asset MIC 101a may connect to the data source 110a via a computer network using the network interface 612. Also, the asset MIC 101a may connect to the SIEM 120 via a computer network using the network interface 612. The data source 101a and the SIEM 120 may reside on servers or other computer systems external to the computer system 600 hosting the asset MIC 101a. Other known electronic components may be added or substituted in the computer system 600.

While the embodiments have been described with reference to examples, various modifications to the described embodiments may be made without departing from the scope of the claimed embodiments.

What is claimed is:

1. An asset model import connector comprising a hardware processor to:
   receive asset data from a data source, wherein the asset data describes an asset with a network interface;
   determine an operation to be performed at a security information and event management (SIEM) system different than the data source based on the received asset data and different than the asset model import connector comprising the hardware processor determining the operation, wherein the STEM system stores security event data for a computer network and correlates the security event data with the received asset data;
   determine asset attributes from a schema to include in code to instruct the STEM system to perform the operation;
   generate the code by populating the asset attributes in the code with values from the received asset data, the code including the determined operation to be performed at the SIEM system, the code executable at the STEM system to perform the determined operation in relation to the asset data described by the asset attributes; and
   send the generated code to the STEM system, the SIEM system performing the determined operation on the asset described by the received asset data having the value with which the asset attributes have been populated in the code.

2. The asset model import connector of claim 1, comprising a data storage to store code templates describing different operations to be performed on asset data stored at the SIEM system, wherein each code template includes different attributes from the schema, and wherein the code is determined from the code template for the operation.

3. The asset model import connector of claim 2, wherein the different operations comprise adding an asset, removing an asset, moving an asset from one group to another, adding an asset to a group, removing an asset from the group, moving an asset from one category to another to another, adding an asset to a category, removing an asset from the category, moving an asset from one zone to another, adding an asset to a zone, removing an asset from the zone, or marking an asset as enabled or disabled.

4. The asset model import connector of claim 1, the processor to:
   identify if the received asset data matches a condition and responsive to the received asset data matching the condition, to send the received asset data to the SIEM system.

5. The asset model import connector of claim 1, the processor to:
   control how much asset data is sent to the STEM system and when to send the asset data to the STEM system.

6. The asset model import connector of claim 1, wherein the selected schema describes the operation.

7. The asset model import connector of claim 1, wherein the STEM system is external to the asset model import connector and the asset model import connector sends the populated schema to the STEM system via a computer network.

8. The asset model import connector of claim 1, the processor to:
   determine the operation from an indication of the operation in the received asset data.

9. The asset model import connector of claim 1, the processor to:
   determine the operation by determining whether the received asset data includes attributes specified in a rule for determining the operation, and responsive to the received asset data includes the attributes, determine the operation from the rule.

10. A non-transitory computer readable medium including machine readable instructions executable by a processor to:
   store a plurality of different code templates at an asset model import connector, wherein the code templates describe different operations to be performed on asset data stored at a security information and event management (SIEM) system that is external to the asset model import connector;
   receive asset data from a data source different than the STEM system, wherein the received asset data describes an asset with a network interface, wherein the SIEM system stores security event data for a computer network and correlates the security event data with the received asset data;

determine an operation to be performed on the asset data stored at the SIEM system based on the received asset data, the SIEM different than the processor determining the operation;

select one of the plurality of code templates for the operation;

generate code from the selected code template, wherein the code includes asset attributes from a schema used to store the asset data at the SIEM system, the code including the determined operation to be performed at the SIEM system, the code executable at the SIEM to perform the determined operation in relation to the asset data described by the asset attributes; and send the generated code to the SIEM system, the SIEM system performing the determined operation on the asset described by the received asset data associated with the asset attributes that have been included in the code.

11. The non-transitory computer readable medium of claim 10, wherein the machine readable instructions to determine the operation comprise machine readable instructions to:

request information associated with the received asset data from the SIEM system; and determine the operation from the requested information.

12. The non-transitory computer readable medium of claim 10, wherein the machine readable instructions to determine the operation comprise machine readable instructions to:

determine the operation from an indication of the operation in the received asset data.

13. The non-transitory computer readable medium of claim 10, wherein the machine readable instructions to determine the operation comprise machine readable instructions to:

determine whether the received asset data includes attributes specified in a rule for determining the operation; and responsive to the received asset data including the attributes, determine the operation from the rule.

14. A method of normalizing asset data at an asset model import connector, the method comprising:

receiving asset data from a data source, wherein the asset data describes an asset with a network interface;

determining an operation to be performed at a security information and event management (SIEM) system different than the data source based on the received asset data and different than the asset model import connector determining the operation, wherein the SIEM system stores security event data for a computer network and correlates the security event data with the received asset data;

generating, by at least one hardware processor, code to instruct the STEM system to perform the operation, wherein the code includes asset attributes from a schema, and the schema is used by the STEM system to store data for assets, the code including the determined operation to be performed at the STEM system, the code executable at the SIEM system to perform the determined operation in relation to the asset data described by the asset attributes;

populating the asset attributes in the code with values from the received asset data; and sending the code with the populated asset values to the SIEM system, the SIEM system performing the determined operation on the asset described by the received asset data having the value with which the asset attributes have been populated in the code.

15. The method of claim 14, wherein the security event data is analyzed to identify network security threats.

16. The method of claim 14, wherein the security event data is captured in logs or messages generated by the data source.

* * * * *